United States Patent Office 3,474,085
Patented Oct. 21, 1969

3,474,085
ALKALI AND ALKALINE EARTH METALLIC
SALTS OF AZOFORMIC ACIDS
Ronald Edward MacLeay, Williamsville, and Chester Stephen Sheppard, Tonawanda, N.Y., assignors to Pennwalt Corporation, a corporation of Pennsylvania
No Drawing. Original application Feb. 15, 1967, Ser. No. 616,165, now Patent No. 3,418,294, dated Dec. 24, 1968. Divided and this application Aug. 21, 1968, Ser. No. 754,485
Int. Cl. C07c 113/00; C08f 3/02
U.S. Cl. 260—192                    4 Claims

ABSTRACT OF THE DISCLOSURE

Alkali metal or alkaline earth metal salts $$R-N=N-C(O)OM$$

where R is broadly a tertiary alkyl, aralyl radical, a cyano-substituted tertiary alkyl radical, or an amido group. Examples are sodium t-butylazoformate and sodium (1-cyano)cyclohexylazoformate. These are useful as low temperature vinyl polymerization initiators. Ethyl acrylate was polymerized to a solid at pH 3 in aqueous emulsion at 10°–15° C. using incremental addition of sodium t-butylazoformate.

CROSS-REFERENCE

This is a division of copending application Ser. No. 616,164, filed Feb. 15, 1967, now U.S. Patent No. 3,418,294.

BACKGROUND OF THE INVENTION (A) $C_6H_5-N=N-C(O)OK$ is known—Thiele, Ber. 28, 2600.

(B) $MO(O)C-N=N-C(O)OM$ is known and has been used as high temperature blowing agents—U.S. Patent No. 3,111,496; French Patent No. 1,310,393, Belgian Patent No. 613,081 and British Patent No. 916,352. [These dimetal salts are not useful as vinyl polymerization initiators.]

(C) Ethoxycarbonylazo - N,N-diethylformamide was made by H. Bock and J. Kramer, Chem. Ber. 99, 2039 (1966).

(D) Neighbors et al., JACS, 44, 1557 (1922), found that caustic potash caused a rearrangement of 2-carbamylazopropane to the isomer acetone semicarbazone. [It has been discovered that no isomerization occurs during the saponification to the mono salt if the alpha carbon atom contains no hydrogen atoms.]

(E) The acid-catalyzed decomposition of azodicarbonate has been studied by C. V. King, JACS 62, 379 (1940), and JACS 65, 767 (1944). Van Tamelen, JACS 83, 3725 (1961), reduced olefins using acetic acid and methanol solutions of sodium azodiformate.

(F) Alkoxycarbonylazoformamides are disclosed by H. C. Marks and R. R. Joiner in U.S. Patent No. 2,903,361

SUMMARY OF THE INVENTION (1) Novel azo mono-metal salts:

(I)
$$R-N=N-\overset{O}{\underset{\|}{C}}-OM$$

where:
(a) M is alkali metal or alkaline earth metal,
(b) R is a radical selected from the group consisting of

and (c) $R_1$ and $R_2$ are lower aliphatic hydrocarbon or cycloaliphatic hydrocarbon radicals and $R_1$ and $R_2$ together may form an alkylene biradical,
(d) $R_3$ is lower aliphatic hydrocarbon, cycloaliphatic hydrocarbon, phenyl, or cyano radicals, and
(e) $R_6$ and $R_7$ are hydrogen, lower aliphatic hydrocarbon or cycloaliphatic hydrocarbon radicals (2) Amidoazoformates:

(II)
$$R_5O-\overset{O}{\underset{\|}{C}}-N=N-\overset{O}{\underset{\|}{C}}-\overset{R_6}{\underset{|}{N}}-R_7$$

where:
(a) $R_5$ is a lower aliphatic hydrocarbon or cycloaliphatic hydrocarbon radical, and
(b) $R_6$ and $R_7$ are hydrogen, lower aliphatic hydrocarbon or cycloaliphatic hydrocarbon radicals.

(3) A process for preparing a composition of the formula (III)
$$R_1-\overset{R_2}{\underset{R_3}{\overset{|}{C}}}-N=N-\overset{O}{\underset{\|}{C}}-OM$$

by saponifying with an alkali metal hydroxide or alkaline earth metal hydroxide, in an aqueous medium, at a temperature below about 25° C., a compound from the group consisting of (1)
$$R_1-\overset{R_2}{\underset{R_3}{\overset{|}{C}}}-N=N-\overset{O}{\underset{\|}{C}}-\overset{R_6}{\underset{|}{N}}-R_7$$

and (2)
$$R_1-\overset{R_2}{\underset{R_3}{\overset{|}{C}}}-N=N-\overset{O}{\underset{\|}{C}}-O-R_8$$

where:
(a) M is alkali metal or alkaline earth metal,
(b) $R_1$ and $R_2$ are lower aliphatic hydrocarbon or cycloaliphatic hydrocarbon radicals and $R_1$ and $R_2$ together may form an alkyline biradical,
(c) $R_3$ is lower aliphatic hydrocarbon, cycloaliphatic hydrocarbon, phenyl or cyano radicals,
(d) $R_6$ and $R_7$ are hydrogen, lower aliphatic hydrocarbon or cycloaliphatic hydrocarbon radicals, and
(e) $R_8$ is a lower alkyl radical.

(4) A process for preparing a composition of the formula (IV)
$$M-O-\overset{O}{\underset{\|}{C}}-N=N-\overset{O}{\underset{\|}{C}}-\overset{R_6}{\underset{|}{N}}-R_7$$

by saponifying with an alkali metal hydroxide or alkaline earth metal hydroxide, in an aqueous medium at a temperature below about 25° C. using not more than 1 mole equivalent of hydroxide per mole of azo reactant, a compound of the formula $$R_5-O-\overset{O}{\underset{\|}{C}}-N=N-\overset{O}{\underset{\|}{C}}-\overset{R_6}{\underset{|}{N}}-R_7$$

where:
(a) M is alkali metal or alkaline earth metal,
(b) $R_5$ is a lower aliphatic hydrocarbon or cycloaliphatic hydrocarbon radical,
(c) $R_6$ and $R_7$ are hydrogen, lower aliphatic hydrocarbon or cycloaliphatic hydrocarbon radicals.

DESCRIPTION OF THE INVENTIONS

Composition I $$R-N=N-\overset{O}{\underset{\|}{C}}-OM$$

may be a salt of any alkali metal or alkaline earth metal. It is to be understood that when the metal has a valence above 1, it will be combined with an equivalent number of "azo" radicals.

It is pointed out that none of the substituents on the carbon atom of R which is joined to the azo N is a hydrogen atom.

The term "lower alkyl" is intended to include from 1 to about 8 carbon atoms. The "phenyl" radical may be substituted with one or more alkyl groups. A lower aliphatic hydrocarbon group may contain up to about 8 carbon atoms. Any cycloaliphatic hydrocarbon group may be present. Lower alkyl and cyclopentyl and cyclohexyl groups are preferred for $R_1$, $R_2$, and $R_5$. An alkylene biradical is illustrated by a cyclohexylene having the azo nitrogen and the cyano group joined to the "1" carbon atom. Hydrogen and lower alkyl are preferred for $R_6$ and $R_7$.

UTILITY

Composition I is outstanding as a low temperature initiator of vinyl monomer polymerization as is demonstrated in some of the working examples.

Formula II is of immediate interest as an intermediate for the preparation of certain species of Composition I.

Formula II:

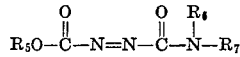

As in Composition I, the carbon atom joined to an azo nitrogen does not have a hydrogen atom joined to it.

The statements made with respect to $R_5$, $R_6$ and $R_7$ in the description to Composition I are applicable in connection with Formula II.

(3) Process for preparing a subgenus of Composition I: The subgenus (III) composition $$R_1R_2R_3C—N=N—C(O)OM$$

is made by saponifying, at a temperature below about 25° C., with alkali metal hydroxide or alkaline earth metal hydroxide, in an aqueous medium either the ester $(R_1R_2R_3)C—N=N—C(O)OR_8$ or the amide $$(R_1R_2R_3)C—N=N—C(O)N(R_6R_7)$$

where $R_1$, $R_2$, $R_3$, $R_6$ and $R_7$ are as defined hereinbefore and $R_8$ is a lower alkyl radical.

The azoamides where $R_6$ and $R_7$ are hydrogen are a preferred reactant because of their solubility in water. The product III can be prepared simply by slurrying the azoamide in a solution of the particular metal hydroxide.

The azo esters are essentially not soluble in water. A solubilizing agent such as dioxane or ethanol permits the reaction to be carried out in the aqueous medium carrying the particular metal hydroxide.

The product salt solutions are unstable above about 25° C. and decompose completely on prolonged standing. Therefore the reaction is carried out at a temperature below about 25° C.

(4) Process for preparing another subgenus of Composition I: The subgenus (IV) composition $$MO(O)C—N=N—C(O)N(R_6R_7)$$

is made by saponifying at a temperature below about 25° C., with alkali metal hydroxide or alkaline earth metal hydroxide, in an aqueous medium, using not more than 1 mole equivalent of hydroxide per mole of azo reactant (II) $R_5O(O)C—N=N—C(O)N(R_6R_7)$.

The azoamide esters where $R_5$ is lower alkyl and $R_6$ and $R_7$ are hydrogen are preferred because these have high solubility in water. The amount of metal hydroxide added is controlled to avoid formation of the dimetal salt. [The dimetal salt is not useful as a vinyl polymerization initiator.]

(5) Vinyl monomer polymerization: Composition I is an extremely good initiator for vinyl monomer polymerization to form solid polymers. Especially valuable is its low temperature effectiveness, temperatures at least as low as (zero) 0° C. The metal salts are completely water soluble and monomer insoluble and are therefore of particular interest in emulsion polymerization because the radicals are generated completely in the water phase.

This initiator may be used with any vinyl monomer but is of especial interest to the vinyl halides, e.g., vinyl chloride, to aliphatic carboxylic acids and esters having a vinyl bond, e.g., acrylic acid, methyl meth-acrylate and ethyl acrylate.

In the presence of acid, even at temperatures as low as 0° C., these compounds rapidly convert to the azoformic acids which rapidly decompose generating radicals, nitrogen and carbon dioxide. A proposed mechanism is:

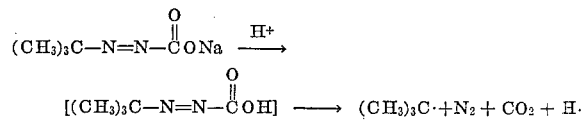

In the absence of acid, the metal salts slowly hydrolyze to the azoformic acid which then rapidly decomposes, generating radicals, nitrogen and carbon dioxide. The hydrolysis rate increases with temperature. It is necessary to prepare the salts at low temperatures (below 25° C.) and to use the solutions shortly after their preparation.

The dry metal salts may be used with an acidic monomer if an anhydrous system is desired.

A major advantage of Compounds I in vinyl polymerizations is the mono metal azoformates can be easily generated from thermally stable non hazardous compounds which can be easily prepared and shipped to the fabricator. The fabricator can prepare the initiator solutions when he is ready to use them. Consequently there are no hazards involved concerning shipping or storage.

Another major advantage is the ability to initiate over a wide range of pH in the emulsion system.

WORKING EXAMPLES AND ILLUSTRATIVE EMBODIMENTS

Example I

Preparation of sodium t-butylazoformate solution

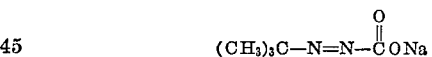

This is an example of the synthesis of general structure I when R=t-butyl.

To a solution of 0.65 g. (.005 m.) t-butylazoformamide in 25 ml. water at 10° C. was added 1.0 g. (.012 m.) 50% sodium hydroxide dropwise. The reaction was stirred ½ hour at 10° C. A few drops of the yellow solution were added to a vial containing a few drops of methylene chloride and the mixture shaken. None of the color went into the methylene chloride layer indicating that the starting material which is soluble in methylene chloride has been completely converted to the methylene chloride insoluble sodium salt.

The aqueous solution began to evolve gas when the temperature of the solution rose above 20° C. The resulting solution was approximately 0.2 M and was stored at 10° C. until it was used (within a few hours).

Example II

Preparation of dry sodium t-butylazoformate

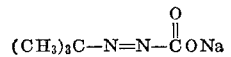

This is an example of the synthesis of the dry salt of structure I.

To a solution of 1.0 g. (.00775 m.) t-butylazoformamide in 15 ml. water cooled to 15° C. was added 1.4 g. (.0175 m.) 50% sodium hydroxide and the solution stirred ½ hour at 15° C. The solution was checked with methylene chloride (as in Example I) to insure that the sodium salt was completely formed.

The solution was then placed on a watch glass and the water evaporated off under a stream of nitrogen. The yellow solid which resulted was slurried in alcohol and filtered. The yellow filtrate was stripped off on a rotating evaporator at room temperature and a yellow powder resulted. The yellow powder did not melt below 270° C. but did turn white around 240° C. The infrared spectrum was consistent with the structure of sodium t-butylazoformate.

The yellow powder gassed vigorously when added to dilute aqueous hydrochloric acid.

Example III

Preparation of barium t-butylazoformate solution

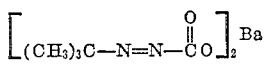

This is an example of the synthesis of general structure I where M is an alkaline earth metal.

To 25 ml. of water was added 1.5 g. (.0048 m.) of $Ba(OH)_2 \cdot 8H_2O$ and the mixture stirred 15 minutes at which time most of the $Ba(OH)_2$ had dissolved. The solution was filtered and 1.0 g. (.00775 m.) of t-butylazoformamide added and the solution stirred ½ hour at 20° C. The solution was checked with methylene chloride to insure that the barium salt was completely formed. The solution was approximately 0.3 N.

The solution was used as such to polymerize acrylic acid.

Example IV

Preparation of sodium (1-cyano)cyclohexylazoformate

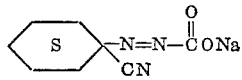

This is an example of the synthesis of general structure I where R contains a cyano group.

To a solution of 1.93 g. (.0107 m.) of 1-carbamylazo-1-cyanocyclohexane in 50 ml. water, cooled to 10° C., was added 2.5 g. (.031 m.) of 50% sodium hydroxide. The temperature was allowed to rise to 15° C. and the solution was stirred at this temperature for 30 minutes, checked for completeness of reaction with methylene chloride and then stored in an ice bath for further use. The resultant solution was approximately 0.21 M.

Example V

Preparation of isopropoxycarbonylazoformamide

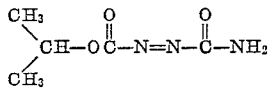

This is an example of general structure II where $R_6$ and $R_7$ are hydrogen.

To a slurry of 4.0 g. (.025 m.) of isopropoxycarbonylhydrazoformamide (prepared from semicarbazine hydrochloride and isopropyl chloroformate), 12 ml. water, and 48 ml. methylene chloride in a 100 ml. round bottom flask was passed 2.0 g. (.028 m.) of chlorine holding the temperature at 5° C. with an ice bath. Then 4.0 g. of sodium chloride were added, the reaction stirred a couple of minutes and the methylene chloride layer separated. The aqueous layer was extracted with an additional 25 ml. methylene chloride and the two methylene chloride layers combined, washed with 10 ml. 10% $NaHCO_3$, dried over anhydrous sodium sulfate, filtered and the methylene chloride evaporated off on a rotating evaporator. The yield was 3.1 g. (78.5%) and the material assayed 97% by HI assay. The infrared spectrum of the product was in agreement with the structure of isopropoxycarbonylazoformamide.

Example VI

Preparation of sodium carbamylazoformate

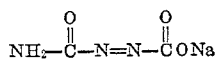

This is an example of the synthesis of general structure I where R is a carbonyl group.

To a slurry of 1.6 g. (.01 m.) of isopropoxycarbonylazoformamide in 30 ml. water at 10° C. was added 10 ml. water containing 0.8 g. (.01 m.) of 50% sodium hydroxide holding the temperature at 10° C. or below by means of an ice bath. The mixture was stirred 15 minutes at which time all the azo had dissolved. The color of the solution turned from orange to yellow during this period. 1 ml. of the yellow solution was added to a vial containing 2 ml. of methylene chloride and the mixture shaken. None of the color went into the methylene chloride layer indicating that the starting material which is methylene chloride soluble had been completely converted to the methylene chloride insoluble sodium salt.

The resultant soltuion was approximately 0.25 M and was used shortly thereafter. It evolved gas slowly even at 10° C.

Example VII

A. Preparation of ethoxycarbonylazo-N-n-butylformamido

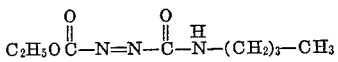

This is an example of general structure II where $R_6$ is an alkyl group.

To a slurry of 1.0 g. (.0049 m.) of ethoxycarbonylhydrazo-N-n-butylformamide (prepared from 4-n-butylsemicarbazide hydrochloride and ethyl chloroformate), 10 ml. water and 10 ml. methylene chloride, cooled to 5° C. by an ice bath, was added 0.33 g. (.0047 m.) of chlorine. The orange color of the azo immediately appeared. The reaction was stirred 10 minutes, separated, the methylene chloride layer washed with 10% sodium bicarbonate solution, water and dried over anhydrous sodium sulfate. The methylene chloride solution was filtered and the methylene chloride stripped off leaving 0.9 g. (90%) of a deep red colored oil. The oil had an infrared spectrum consistent with the structure of ethoxycarbonylazo-N-n-butylformamide and it assayed 97% with HI.

B. Also prepared by this procedure were isopropoxycarbonylazo-N-n-butylformamide

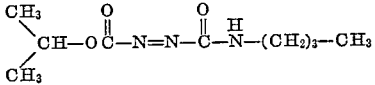

C. and isopropoxycarbonylazo-N-phenylformamide

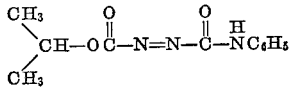

Example VIII

Polymerization of acrylic acid with sodium t-butylazoformate solution: This is an example of the polymerization of an acidic monomer with a solution of general Structure I where R=t-butyl.

To a solution of 10 ml. of acrylic acid and 10 ml. water at 27° C. was added 3 ml. of 0.2 M sodium t-butylazoformate (from Example I) dropwise. The reaction temperature quickly rose to 70° C. whereupon the reaction product mixture became so viscous that it could not be stirred.

Example IX

Polymerization of acrylic acid with dry sodium t-butylazoformate: This is an example of the polymerization of an acidic monomer with dry I where R=t-butyl.

To 20 ml. of acrylic acid at room temperature was added 0.25 g. of dry sodium t-butylazoformate (from Example II) in small increments. As soon as the salt hit the acrylic acid, it immediately began foaming and polymerization began at that spot. The temperature rose to 40° C. The chunks of polymer which formed had to be removed from the beaker so stirring could continue and the remainder of the initiator added.

Example X

Polymerization of acrylic acid with barium t-butylazoformate solution: This is an example of the polymerization of an acidic monomer with a solution of general structure I where M is an alkaline earth metal.

To a solution of 10 ml. acrylic acid and 10 ml. water at room temperature was added 3 ml. of 0.3 N barium t-butylazoformate (from Example III) over 2½ hours. The temperature was held below 40° C. by controlling the rate of addition of the initiator solution. At the end of 2½ hours the reaction product mixture became too viscous to stir.

Example XI

Polymerization of acrylic acid with sodium (1-cyano) cyclohexylazoformate solution: This is an example of the polymerization of an acidic monomer with a solution of general structure I, where R=1-cyanocyclohexyl, at two different temperatures.

(A) A solution of 10 ml. water and 10 ml. acrylic acid was cooled to 0° C. in an ice bath and 10 ml. of 0.21 M sodium (1-cyano)cyclohexylazoformate (from Example IV) added dropwise over 20 minutes holding the temperature below 5° C. with an ice bath. The reaction mixture became very viscous and could not be stirred with a magnetic stirring bar.

(B) To a solution of 10 ml. water and 10 ml. acrylic acid was added 3 ml. of 0.21 M sodium (1-cyano)cyclohexylazoformate (from Example IV) over a two minute span at room temperature. There was rapid gas evolution and the reaction mixture became so viscous it was impossible to stir with a magnetic stirring bar.

Example XII

Polymerization of acrylic acid with sodium carbamylazoformate solution: This is an example of the polymerization of an acidic monomer with a solution of general structure I where R is a carbamyl radical.

To a solution of 10 ml. acrylic acid and 10 ml. water at 18° C. was added 1 ml. of 0.25 M sodium carbamylazoformate (from Example VI). The temperature was held below 40° C. by controlling the rate of addition of the initiator solution. At the end of the addition the temperature had risen to 38° C. and the solution became too viscous to stir.

Test XIII

Polymerization of acrylic acid with di-potassium azodiformate: This test demonstrates that dipotassium azodiformate of general structure I where R=

a previously known compound, does not polymerize acrylic acid using the procedure used with other I compounds.

To a solution of 10 ml. water and 10 ml. acrylic acid at room temperature was added 0.1 g. of the dipotassium salt of azodiformic acid in small increments. There was a small amount of gas evolution but no exotherm was observed. The reaction was stirred an additional ½ hour at room temperature, transferred to a watch glass and the water and monomer allowed to evaporate in the hood. Upon evaporation there was no evidence of any polymer formation.

TEST XIV

Polymerization of acrylic acid with sodium phenylazoformate solution: This test demonstrates that sodium phenylazoformate of general structure I where R=$C_6H_5$, a previously known compound does not polymerize acrylic acid using the procedure used with other I compounds.

To a solution of 10 ml. water and 10 ml. acrylic acid at room temperature was added 7 ml. of 0.2 M sodium phenylazoformate dropwise over 20 minutes. No gas evolution and no exotherm were observed. The reddish brown color of the azo solution remained after its addition to the acrylic acid. The reaction was stirred an additional hour at room temperature, transferred to a watch glass and the water and monomer allowed to evaporate in the hood. Upon evaporation there was no evidence of any polymer formation.

Example XV

Polymerization of ethyl acrylate with sodium t-butylazoformate at pH 9: This example demonstrates the use of sodium t-butylazoformate in an emulsion polymerization at a basic or neutral pH.

*Method A.*—A mixture of 50 g. of ethylacrylate, 50 g. water and 6 g. Triton X-200 emulsifying agent was placed in a 4-neck round bottom flask equipped with a water cooled condenser, a thermometer, a self-venting addition funnel, tubing for the continuous flushing of the system with nitrogen, and a mechanical stirrer. The mixture was stirred 10 minutes in a water bath maintained below room temperature. To this mixture was added a solution containing $1.5 \times 10^{-3}$ moles of sodium t-butylazoformate (prepared as in Example I) from the addition funnel. The mixture was allowed to mix 5 minutes after which time the water bath was removed and the reaction allowed to continue. Polymerization was evident when the reaction temperature rose above room temperature. The reaction was stopped when the reaction temperature returned to room temperature. Aliquots of the emulsion were taken, the water and unreacted monomer allowed to evaporate off and the percent conversion was calculated as 80%.

Example XVI

Polymerization of ethyl acrylate with sodium t-butylazoformate at pH 3: This example demonstrates the use of sodium t-butylazoformate in an emulsion polymerization at acidic pH.

*Method B.*—A mixture of 50 g. of ethylacrylate, 50 g. water and 6 g. Triton X-200 emulsifying agent was placed in a 4-neck round bottom flask equipped with a water cooled condenser, a thermometer, a self-venting addition funnel, tubing for the continuous flushing of the system with nitrogen, and a mechanical stirrer. The mixture was cooled to 0° C. in an ice bath. The pH of the emulsion was adjusted to 3 by addition of dilute hydrochloric acid. To the stirred emulsion was added dropwise a solution containing $1.5 \times 10^{-3}$ moles of sodium t-butylazoformate (prepared as in Example I). Polymerization began to occur immediately as indicated by a rise in temperature of 10–15° C. above the temperature of the ice bath. The reaction was stopped after all the initiator solution had been added, the exotherming had ceased and the temperature returned to the temperature of the ice bath. Aliquots of the emulsion were taken, the water and unreacted monomer allowed to evaporate off and the percent conversion was calculated as 94%.

Example XVII

Polymerization of ethyl acrylate with sodium carbamylazoformate at pH 9: This example demonstrates the use of sodium carbamylazoformate in an emulsion polymerization at a basic or neutral pH.

The procedure was the same as that described in Example XV except a solution containing $1.5 \times 10^{-3}$ moles of sodium carbamylazoformate (prepared as in Example VI) was used as the initiator, the percent conversion was 83.4%.

Example XVIII

Polymerization of ethyl acrylate with sodium carbamylazoformate at pH 3: This example demonstrates the use of sodium carbamylazoformate in an emulsion polymerization at an acidic pH.

The procedure was the same as that described in Example XVI except a solution containing $1.5 \times 10^{-3}$ moles of sodium carbamylazoformate (prepared as in Example VI) was used as the initiator, the percent conversion was 37%.

Test XIX

Polymerization of ethyl acrylate with sodium phenylazoformate at pH 8. This test demonstrates that sodium phenylazoformate is not a good initiator in an emulsion polymerization at a basic or neutral pH.

The procedure was the same as that described in Example XV except a solution containing $1.5 \times 10^{-3}$ moles of sodium phenylazoformate was used as the initiator, the percent conversion was 18%.

Test XX

Polymerization of ethyl acrylate with sodium phenylazoformate at pH 3: This test demonstrates the sodium phenylazoformate is not a good initiator in an emulsion polymerization at an acidic pH.

The procedure was the same as that described in Example XVI except a solution containing $1.5 \times 10^{-3}$ moles of sodium phenylazoformate was used as the initiator, the percent conversion was 7%.

Test XXI

Polymerization of ethyl acrylate with dipotassium azodiformate at pH 9: This test demonstrates that dipotassium azodiformate is not a good initiator in an emulsion polymerization at a basic pH.

The procedure was the same as that described in Example XV except a solution containing $1.8 \times 10^{-3}$ moles of dipotassium azodiformate was used as the initiator, the percent conversion was 4.5%.

Test XXII

Polymerization of ethyl acrylate with dipotassium azodiformate at pH 3: This test demonstrates that dipotassium azodiformate is not a good initiator in an emulsion polymerization at an acidic pH.

The procedure was the same as that described in Example XVI except a solution containing $1.8 \times 10^{-3}$ moles of dipotassium azodiformate was used as the initiator, the percent conversion was 3.5%.

Thus having described the invention what is claimed is:

1. A compound having the formula:

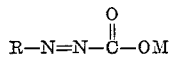

where:
(a) M is alkali metal or alkaline earth metal,
(b) R is selected from the group consisting of

and

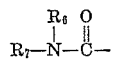

(c) $R_1$ and $R_2$ are lower alkyl or lower cycloalkyl and $R_1$ and $R_2$ together may be lower alkylene,
(d) $R_3$ is lower alkyl, lower cycloalkyl, phenyl, or cyano, and
(e) $R_6$ and $R_7$ are hydrogen, lower alkyl or lower cycloalkyl.

2.

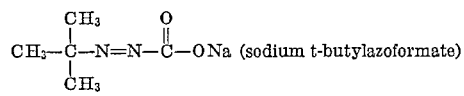

3.

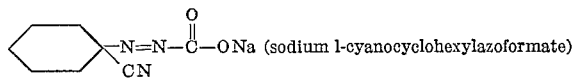

4.

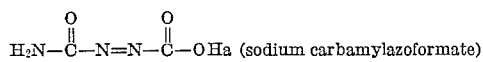

References Cited

UNITED STATES PATENTS

| | | | |
|---|---|---|---|
| 2,889,245 | 6/1959 | Bonrath et al. | 260—192 XR |
| 2,903,361 | 9/1959 | Marks et al. | 260—192 XR |
| 2,910,463 | 10/1959 | Urbschat et al. | 260—192 XR |
| 3,140,310 | 7/1964 | Zweig et al. | 260—192 XR |
| 3,141,002 | 7/1964 | Hill | 260—192 XR |
| 3,346,554 | 10/1967 | Fuchs | 260—192 |

OTHER REFERENCES

Chaco et al., J. Org. Chem., volume 27, pages 2765 to 2767 (1962).

Nesmeygnov et al., Chemical Abstracts, vol. 44, pp. 7791 to 7792 (1950).

Wagner et al., "Synthetic Organic Chemistry," pages 416 to 417 (1953).

FLOYD D. HIGEL, Primary Examiner

U.S. Cl. X.R.

260—93.7, 95, 92.8, 89, 80, 482, 29.6, 676; 252—431; 23—101, 150